(12) United States Patent
Matsushima et al.

(10) Patent No.: US 8,314,855 B2
(45) Date of Patent: Nov. 20, 2012

(54) REPRODUCING APPARATUS AND RECORDING APPARATUS

(75) Inventors: Shuichiro Matsushima, Tokyo (JP); Toshinori Koba, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 483 days.

(21) Appl. No.: 12/390,088

(22) Filed: Feb. 20, 2009

(65) Prior Publication Data
US 2009/0213485 A1 Aug. 27, 2009

(30) Foreign Application Priority Data
Feb. 26, 2008 (JP) ................................. 2008-045097

(51) Int. Cl.
*H04N 5/76* (2006.01)
(52) U.S. Cl. ................................. 348/231.3; 348/231.2
(58) Field of Classification Search ............. 348/231.99, 348/231.2, 231.3, 231.6, 231.7
See application file for complete search history.

(56) References Cited

U.S. PATENT DOCUMENTS

| | | | |
|---|---|---|---|
| 2001/0006400 A1* | 7/2001 | Kubo et al. ................ | 348/233 |
| 2003/0011684 A1* | 1/2003 | Narayanaswami et al. ........................ | 348/207.99 |
| 2004/0056967 A1* | 3/2004 | Ito et al. ..................... | 348/231.2 |
| 2005/0259163 A1* | 11/2005 | Tsujii et al. ................ | 348/231.2 |
| 2006/0044470 A1* | 3/2006 | Koike ........................ | 348/552 |

FOREIGN PATENT DOCUMENTS

| | | |
|---|---|---|
| JP | 02-257485 A | 10/1990 |
| JP | 2005223536 A | 8/2005 |
| JP | 2005-267731 A | 9/2005 |
| JP | 2006-005723 A | 1/2006 |
| JP | 2006165991 A | 6/2006 |
| JP | 2006229595 A | 8/2006 |

OTHER PUBLICATIONS

Japanese Office Action for JP 2008-045097 dated Apr. 10, 2012.

* cited by examiner

*Primary Examiner* — Kelly L Jerabek
(74) *Attorney, Agent, or Firm* — Carter, DeLuca, Farrell & Schmidt LLP

(57) ABSTRACT

A reproducing apparatus includes a recording medium mounting detection unit configured to detect that a detachable recording medium is mounted, and a file analysis unit configured to analyze a file recorded in the recording medium. When the recording medium mounting detection unit detects that the recording medium is mounted, representative information that represents recorded content on the recording medium (a representative image and/or a representative title) is acquired from the recording medium and displayed on a display unit prior to file analysis by the file analysis unit.

8 Claims, 22 Drawing Sheets

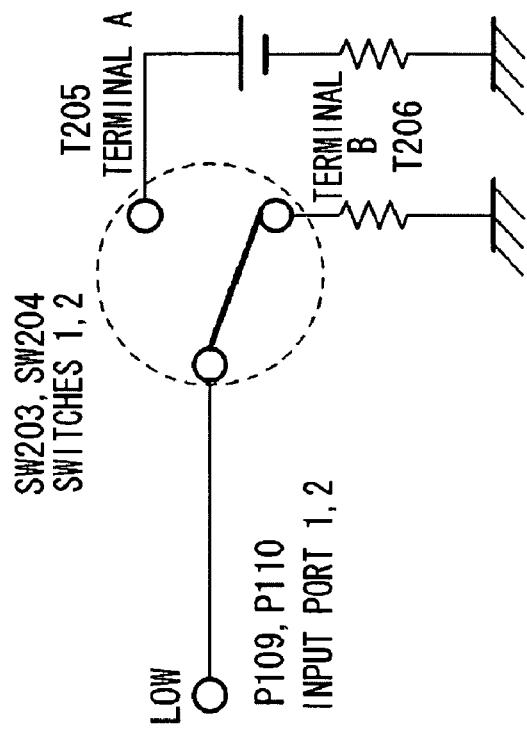
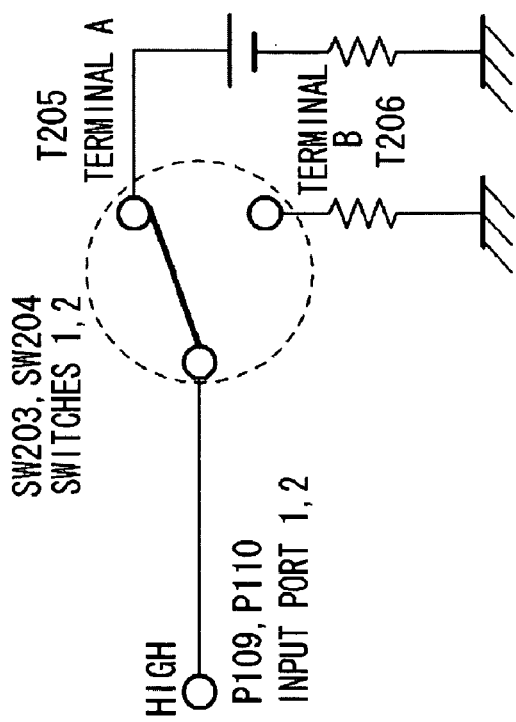
FIG. 3A
FIG. 3B

FIG. 5F

REPRESENTATIVE IMAGE REGISTRATION SCREEN  102-0256

2007 GROWTH RECORD a b c d e f  
g h i j k l  
m n o p q r  
s t u v w x  
y z

CONVERT | ABC-123 SYMBOL | SET

TITLE ENTRY SCREEN

FIG. 5E

REPRESENTATIVE IMAGE REGISTRATION SCREEN  102-0256

DO YOU WANT TO ENTER A TITLE ?

YES | NO

TITLE ENTRY SELECTION SCREEN

FIG. 5G

REPRESENTATIVE IMAGE REGISTRATION SCREEN  102-0256

THE REPRESENTATIVE IMAGE HAS BEEN REGISTERED.

REPRESENTATIVE IMAGE REGISTRATION ENDING SCREEN

REPRESENTATIVE IMAGE DISPLAY SCREEN
(IMAGE AND TITLE)

REPRESENTATIVE IMAGE DISPLAY SCREEN
(IMAGE ONLY)

REPRESENTATIVE IMAGE DISPLAY SCREEN
(TITLE ONLY)

REPRESENTATIVE IMAGE DELETION SETTING SCREEN

TITLE DELETION SETTING SCREEN

REPRODUCING APPARATUS AND RECORDING APPARATUS

BACKGROUND OF THE INVENTION

1. Field of the Invention

The present invention relates to a reproducing apparatus and recording apparatus into which a detachable recording medium is mounted.

2. Description of the Related Art

In recent years, with a remarkable increase of the capacity of a semiconductor memory card, a great deal of contents can be recorded in a single memory card. Further, since a price of a memory card has decreased, it has become possible for many people to have a plurality of memory cards.

Since a memory card is small in size, a title and memo cannot be written on a label on a surface of a medium such as a disk media. Thus, it is difficult to confirm what is recorded in the memory card from an external appearance thereof. When using a digital camera, in order to find out which memory card has recorded a desired image, a user needs to mount and reproduce a memory card.

When a great number of images are recorded, it takes long time for initial processing (including memory card accesses initialization processing, file analysis processing and reproducing preparation processing) right after the memory card is mounted, and the user needs to wait until reproducing is started. Further, when a first image displayed after the initial processing is not a characteristic (representative) image that represents what is recorded, the user needs to sequentially reproduce the recorded images to confirm the contents. Furthermore, when there is a plurality of memory cards, the user needs to repeat such an operation until a desired memory card is found. Thus, a burden on the user is large.

When a memory card is mounted and reproduced, some reproducing apparatuses can analyze a number of files and display a list of recorded images. However, since processing time for displaying the list is generally increased according to an increased number of files and an increased memory capacity, the user needs to wait until reproducing is started. Further, when there are a plurality of memory cards, the user needs to repeat the operation until the desired memory card is found. Thus, the burden on the user is still large.

In order to address the above-described problem, a method is discussed in which an integrated circuit (IC) tag is added to a recording medium to instantly inform a user of recorded content (refer to Japanese Patent Application Laid-Open No. 2005-267731).

Another technique discusses a method in which label information (recorded date and title) recorded in a video tape is analyzed and displayed when it is recognized that the video tape is mounted (refer to Japanese Patent Application Laid-Open No. 02-257485). Yet another technique discusses a method in which a recorded representative image is displayed in a predetermined period from when power is turned on to when moving image information can be picked up or recorded (refer to Japanese Patent Application Laid-Open No. 2006-5723).

However, as described in Japanese Patent Application Laid-Open No. 2005-267731, if an IC tag is added to the recording medium, it is necessary to newly add an antenna and a reading apparatus to the recording medium and a host apparatus. Thus, a cost is increased.

The technique discussed in Japanese Patent Application Laid-Open No. 02-257485 is directed to a tape medium. However, since a recording medium such as a memory card is too small to write a title or memo on a label on a medium surface, it is difficult to confirm recorded content in the recording medium from an external appearance thereof.

Furthermore, since only a representative image selected by a user can be displayed by the method discussed in Japanese Patent Application Laid-Open No. 2006-57263, the user eventually needs to sequentially reproduce images for confirmation.

SUMMARY OF THE INVENTION

The present invention is directed to a method for easily and rapidly confirming recorded content in a recording medium by a user without increasing costs.

According to an aspect of the present invention, a reproducing apparatus includes a recording medium mounting detection unit configured to detect that a detachable recording medium is mounted, a file analysis unit configured to analyze a file recorded on the recording medium, an acquirement unit configured to acquire representative information that represents recorded content on the recording medium, a control unit configured to output the representative information which is acquired by the acquirement unit to an output unit prior to file analysis by the file analysis unit when the recording medium mounting detection unit detects that the recording medium is mounted, and a recording medium cover detection unit configured to detect an open and closing status of a recording medium cover. The control unit causes the file analysis unit to start file analysis when the recording medium cover detection unit detects that a status of the recording medium cover is changed from open to closed, after outputting the representative information to the output unit.

According to another aspect of the present invention, a reproducing apparatus includes a recording medium mounting detection unit configured to detect that a detachable recording medium is mounted, a file analysis unit configured to analyze a file recorded on the recording medium, an acquirement unit configured to acquire representative information that represents recorded content on the recording medium, a control unit configured to output the representative information which is acquired by the acquirement unit to an output unit prior to file analysis by the file analysis unit when the recording medium mounting detection unit detects that the recording medium is mounted, and a timing unit. The control unit causes the file analysis unit to start file analysis when the timing unit detects that a predetermined time has elapsed, after outputting the representative information to the output unit.

According to yet another aspect of the present invention, a recording apparatus which uses a detachable recording medium including a first region that is managed by a file system and a second region that is not managed by the file system to record a file in the first region includes a representative information generation/recording processing unit configured to generate representative information that represents recorded content in the first region and record the representative information in the second region.

According to exemplary embodiments of the present invention, when the recording medium is mounted, representative information is output prior to performing file analysis. Thus, a user can easily and rapidly confirm recorded content in the recording medium. Further, since the recording medium does not need to include an IC tag, cost of the recording medium is not increased.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 3A and 3B illustrate a circuit configuration of a recording medium mounting detection unit and a recording medium cover detection unit of a recording medium mounting unit.

FIGS. 5A to 5G illustrate procedures for registering and deleting representative information that is displayed on a display unit as a user interface according to an exemplary embodiment.

DETAILED DESCRIPTION OF THE EMBODIMENTS

A variety of exemplary embodiments, features, and aspects of the invention will be described in detail below with reference to the drawings.

Figure 1:
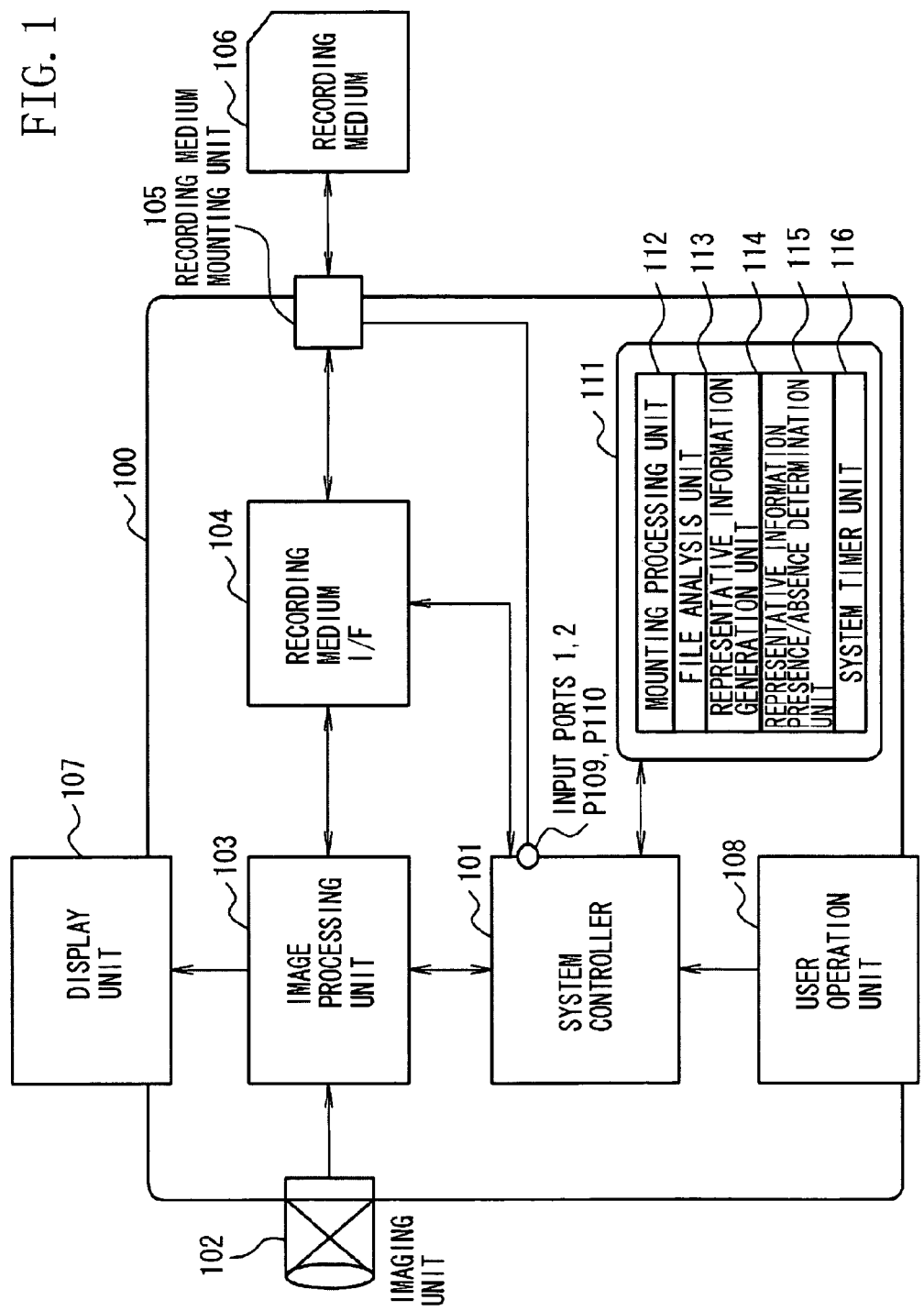
FIG. 1 is a block diagram illustrating a configuration of a digital camera according to a first exemplary embodiment of the present invention.

FIG. 1 illustrates a configuration of a digital camera (hereinafter, referred to as a "camera") according to a first exemplary embodiment. Using a camera 100, an example in which an image is recorded in and reproduced from a recording medium such as a memory card will be described. The camera 100 includes a system controller 101 for controlling the camera and a block for processing each function.

When image data is recorded using the camera 100, an external light that passes through an imaging unit 102 forms an optical image on a surface of an image sensor and is converted into an electric signal by the image sensor.

The imaging unit 102 includes an optical system, a motor that controls the optical system, and the image sensor. The electric signal output from the imaging unit 102 is converted into digital data by an image processing unit 103. The digital data is recorded in a recording medium 106 via a recording medium interface 104. The recording medium 106 is detachably mounted in a recording medium mounting unit 105 of a main body of the camera 100.

When the image data is reproduced using the camera 100, the image data read out from the recording medium 106 via the recording medium interface 104 is converted into optimum data for display by the image processing unit 103, and displayed on a display unit 107 that is an output unit.

A user can operate a user operation unit 108 to operate the camera 100.

As various units for realizing the present invention, a group of programs that causes the camera 100 to function is recorded in a recording unit 111. The program group causes the system controller 101 to function as a mounting processing unit 112, a file analysis unit 113, a representative information generation unit 114, a representative information presence/absence determination unit 115, and a system timer unit 116.

Figure 2:
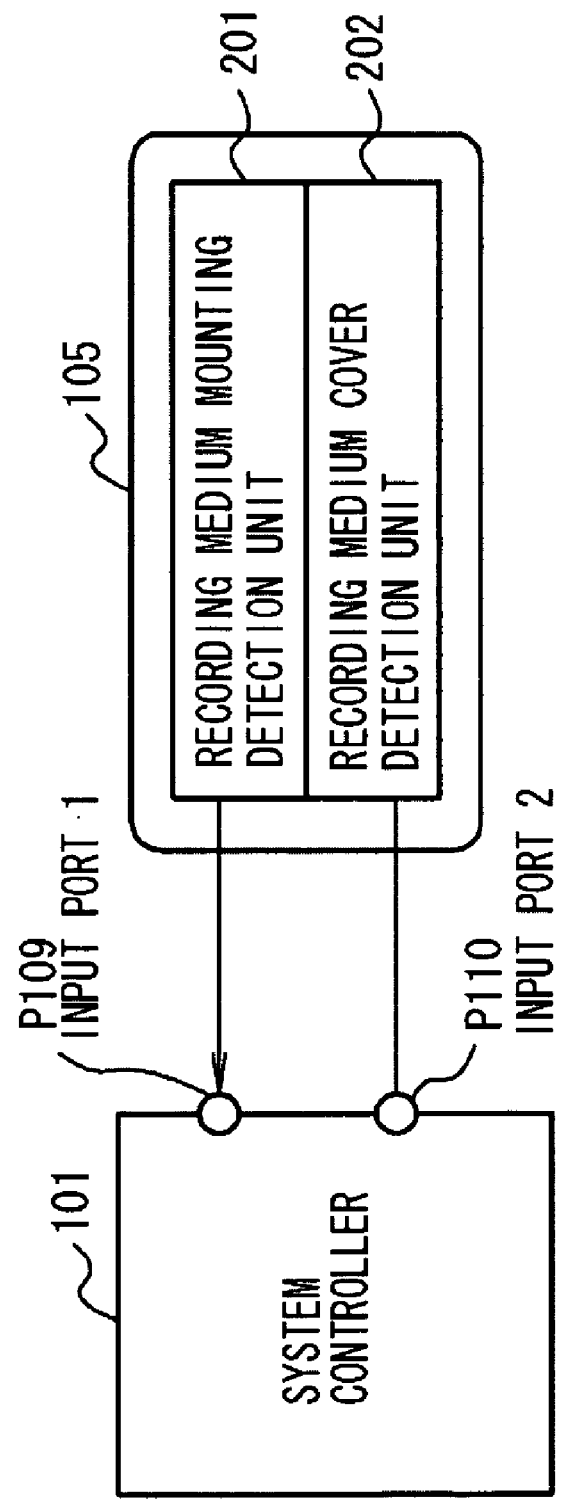
FIG. 2 is a block diagram illustrating a configuration of a recording medium mounting unit.

FIG. 2 is a block diagram illustrating a configuration of the recording medium mounting unit 105. As illustrated in FIG. 2, the recording medium mounting unit 105 includes a recording medium mounting detection unit 201 and a recording medium cover detection unit 202. The recording medium mounting detection unit 201 notifies the system controller 101 of whether the recording medium 106 is mounted via an input port 1 (P109). The recording medium cover detection unit 202 notifies the system controller 101 of an open and closed status of a cover (lid, not illustrated) of the recording medium 106 via an input port 2 (P110).

FIGS. 3A and 3B illustrate a circuit configuration of the recording medium mounting detection unit 201 and the recording medium cover detection unit 202 of the recording medium mounting unit 105. In the recording medium mounting detection unit 201, as illustrated in FIG. 3A, when the recording medium 106 is not mounted in the recording medium mounting unit 105, a switch 1 (SW203) is connected to a terminal A (T205) and a HIGH signal is input to the input port 1 (P109) of the system controller 101.

On the other hand, as illustrated in FIG. 3B, when the recording medium 106 is mounted in the recording medium mounting unit 105, the switch 1 (SW203) is switched from the terminal A (T205) to a terminal B (T206), and a LOW signal is input to the input port 1 (P109) of the system controller 101. By switching of the signals, the system controller 101 can detect whether the recording medium 106 is mounted.

The recording medium cover detection unit 202 is configured similar to the recording medium mounting detection unit 201. More specifically, when the cover of the recording medium is opened, a switch 2 (SW204) is connected to the terminal A (T205) and the HIGH signal is input to an input port 2 (P110). On the other hand, when the cover of the recording medium is closed, the switch 2 (SW204) is connected to the terminal B (T206), and the LOW signal is input to the input port 2 (P110).

Each processing operation of the camera 100 will be described below. When the recording medium 106 is mounted, the mounting processing unit 112 performs mounting processing on the recording medium 106. In the mounting processing, the recording medium 106 and the camera 100 communicate with each other to transmit an initialization command, various parameters, and register values necessary for using the recording medium 106. Further, initialization of file system setting and information acquirement are performed in the mounting processing to enable access to a file in the recording medium 106.

Figure 4A:
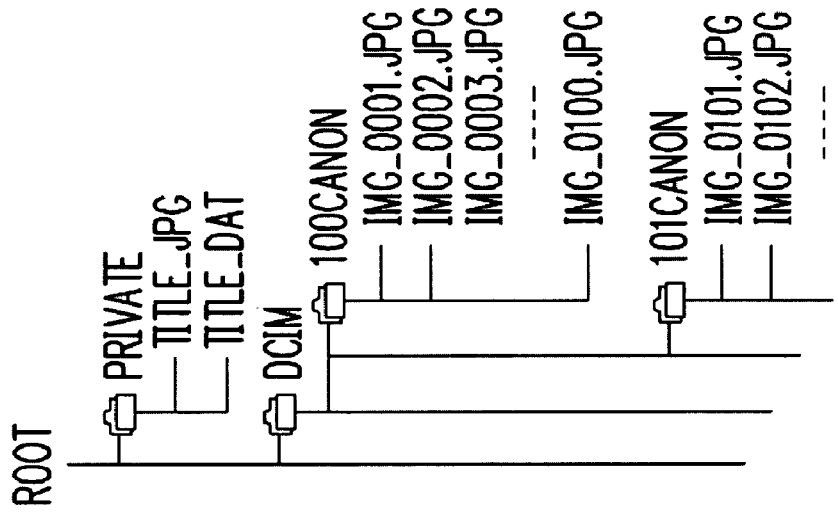
FIGS. 4A and 4B illustrates a file configuration of files to be recorded in a recording medium.
Figure 4B:
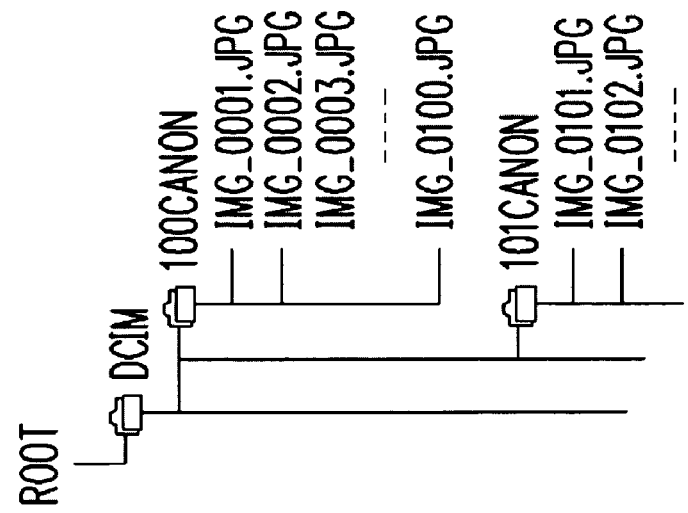

FIGS. 4A and 4B illustrate a configuration of files to be recorded in the recording medium 106. The image data recorded in the recording medium 106 is managed with a file number having a directory structure formed of a series of numerals and character strings (FIG. 4A), and the file analysis unit 113 can analyze a file in a directory.

The camera 100 analyzes folders under a "DCIM" folder which exists in a root directory of the recording medium 106 in which the image data is recorded. The file analysis unit 113 searches to determine what file number exist in each directory, recognizes a file extension of each file, and determines whether the file can be reproduced.

Further, the representative information generation unit 114 generates representative information as described in detail below. As shown in FIG. 4B, a representative image is recorded as the representative information under a "PRIVATE" folder which exists in a root directory by a file name of "TITLE.JPG." Further, when a title (character strings) is added to the representative image and only the title is registered as the representative information, the title is recorded under the "PRIVATE" folder by a file name of "TITLE.DAT".

A method for registering and deleting the representative information (representative image and title) will be described with reference to the user operation and internal processing in the camera 100. FIGS. 5A to 7B illustrate procedures for registering and deleting the representative information which is displayed on the display unit 107 as a user interface.

Figure 8:
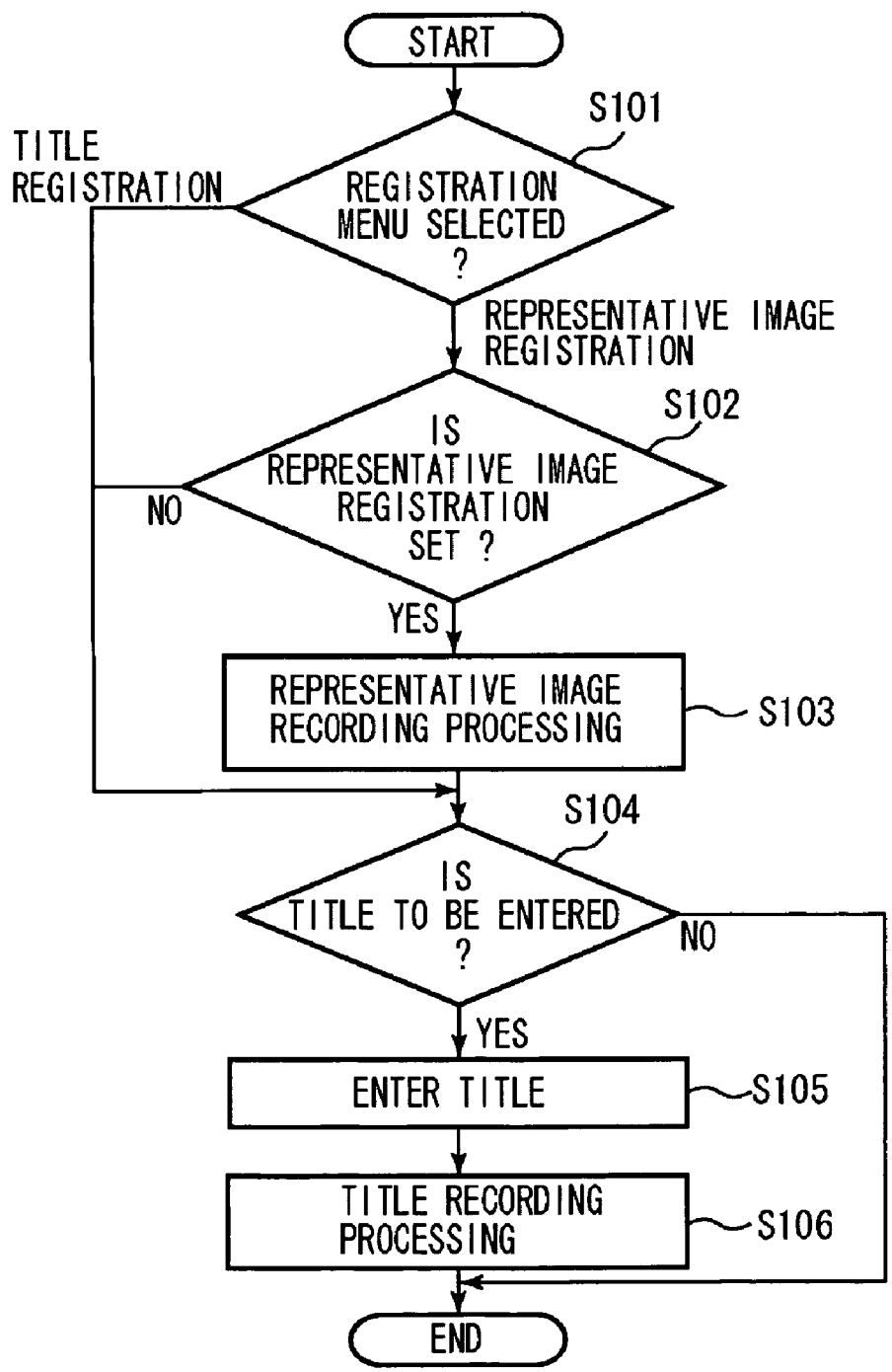
FIG. 8 is a flowchart illustrating a processing flow when the representative information is registered.

FIG. 8 is a flowchart illustrating a processing flow when the representative information is registered. Referring to FIGS. 5A to 5G, the flow when the representative information is registered is described below.

Figure 5B:
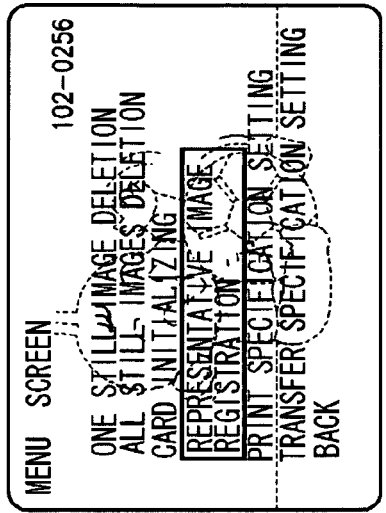
Figure 5D:
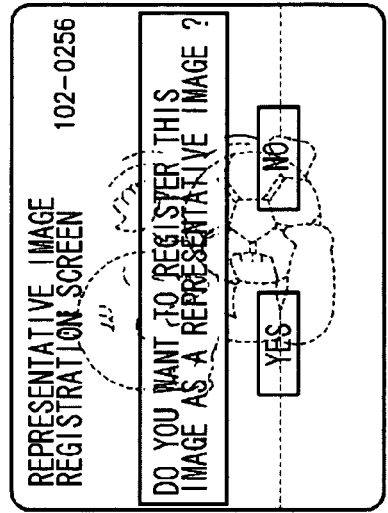
Figure 5A:
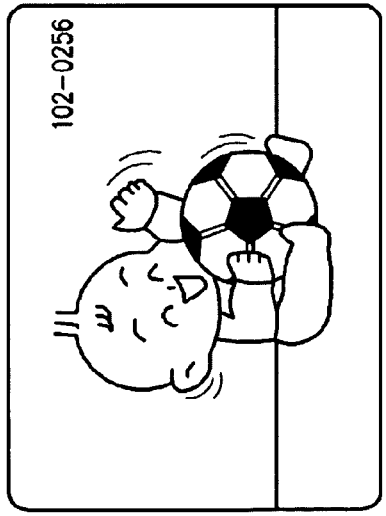
Figure 5C:
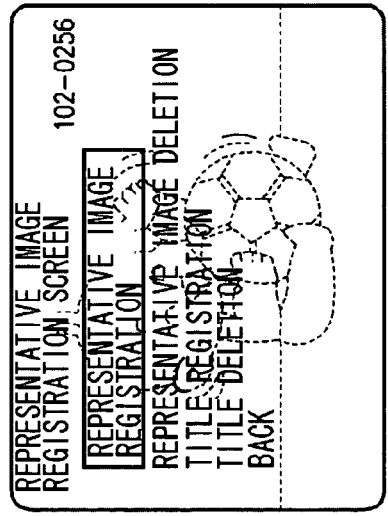

The representative image is registered by selecting an image that is being reproduced in a reproduction mode. As illustrated in FIGS. 5A and 5B, a user operates the camera to display a menu selection screen while one image is being reproduced. In the menu selection screen (FIG. 5B), when the user selects "representative image registration", the screen is changed to a representative image registration menu screen as illustrated in FIG. 5C. The exemplary representative image registration screen illustrated in FIG. 5C allows a user to select "representative image registration" or "title registration." The exemplary representative image registration screen illustrated in FIG. 5C also allows a user to select "representative image deletion" or "title deletion" to delete an already registered image or title, respectively.

In the camera 100, in step S101, the system controller 101 determines whether the "representative image registration" or the "title registration" of the registration menu is selected in the representative image registration menu screen (FIG. 5C)

In step S101, when the "representative image registration" is selected, the processing proceeds to step S102. When the "title registration" is selected, the processing proceeds to step S104. In step S102, the system controller 101 determines whether representative image registration setting is instructed. More specifically, when the user selects the "representative image registration" in the representative image registration menu screen (FIG. 5C), the screen is changed to a representative image registration setting screen such as the one illustrated in FIG. 5D. On the representative image registration setting screen, the user selects "Yes" to set the representative image registration and "No" to cancel the registration.

In step S102, when the representative image registration setting is instructed (YES in step S102), the process proceeds to step S103, and the system controller 101 executes representative image recording processing. More specifically, when the user selects "Yes" in the representative image registration setting screen (FIG. 5D), the representative image recording processing is executed. The camera 100 stores the representative image with a file name of "TITLE.JPG" in the "PRIVATE" directory in the recording medium 106.

An original image selected as the representative image has a high resolution. However, it is suitable for the representative image to have a lower resolution so that the image can be displayed at a high speed. If the representative image has the same resolution as that of the display unit 107, the representative image can be optimally displayed. Thus, in the representative image recording processing, the original image is resized to have a predetermined resolution and recorded in the recording medium 106.

After the representative image recording processing, the processing proceeds to step S104, and the system controller 101 determines whether the title needs to be entered. More specifically, when recording of the representative image is completed, as illustrated in FIG. 5E, a title entry selection screen is subsequently displayed. In the title entry selection screen, the user can select "Yes" to enter the title and "No" not to enter. Both when the "tile registration" is selected in step S101 and when the representative image registration setting is not instructed in step S102 (NO in step S102), the process proceeds to step S104.

In step S104, when the title does not need to be entered (NO in step S104), the processing is ended.

When the title needs to be entered in step S104 (YES in step S104), the process proceeds to step S105, and the system controller 101 executes title entry processing. More specifically, when the user selects "Yes" in the title entry selection screen (FIG. 5E), the title entry screen is displayed as illustrated in FIG. 5F, and the user can enter the title. When the title is entered, the processing proceeds to step S106, and the system controller 101 executes title recording processing and then the processing is ended. More specifically, when the user selects "Set" in the title entry screen (FIG. 5F) after entering the title, the title recording processing is executed. The camera 100 stores character string data with a file name of "TITLE.DAT" in the "PRIVATE" directory.

The representative information registration is completed by the processing as described above, and a message "representative image has been registered" is displayed on the screen as illustrated in FIG. 5G.

Figure 6A:
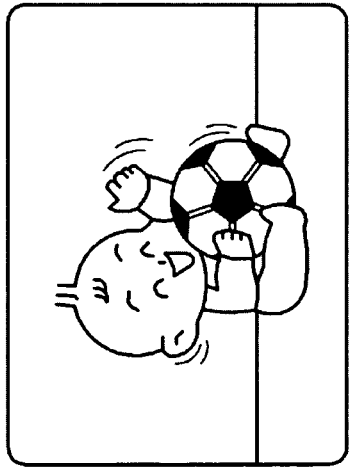
FIGS. 6A to 6C illustrate a status in which the representative information is.
Figure 6B:
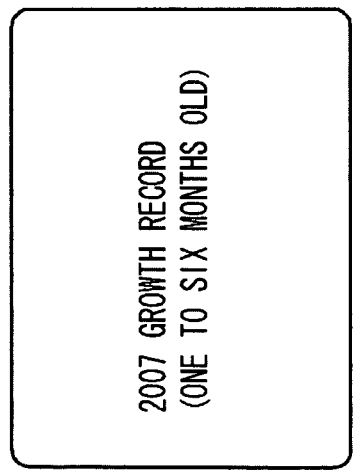
Figure 6C:

The representative image recorded by the above-described procedure is superimposed on the title and displayed as illustrated in FIG. 6A. When the title is not entered, only the representative image is displayed as illustrated in FIG. 6B. Further, when only the title is entered, the title is displayed at a center of the screen as illustrated in FIG. 6C.

Figure 9:
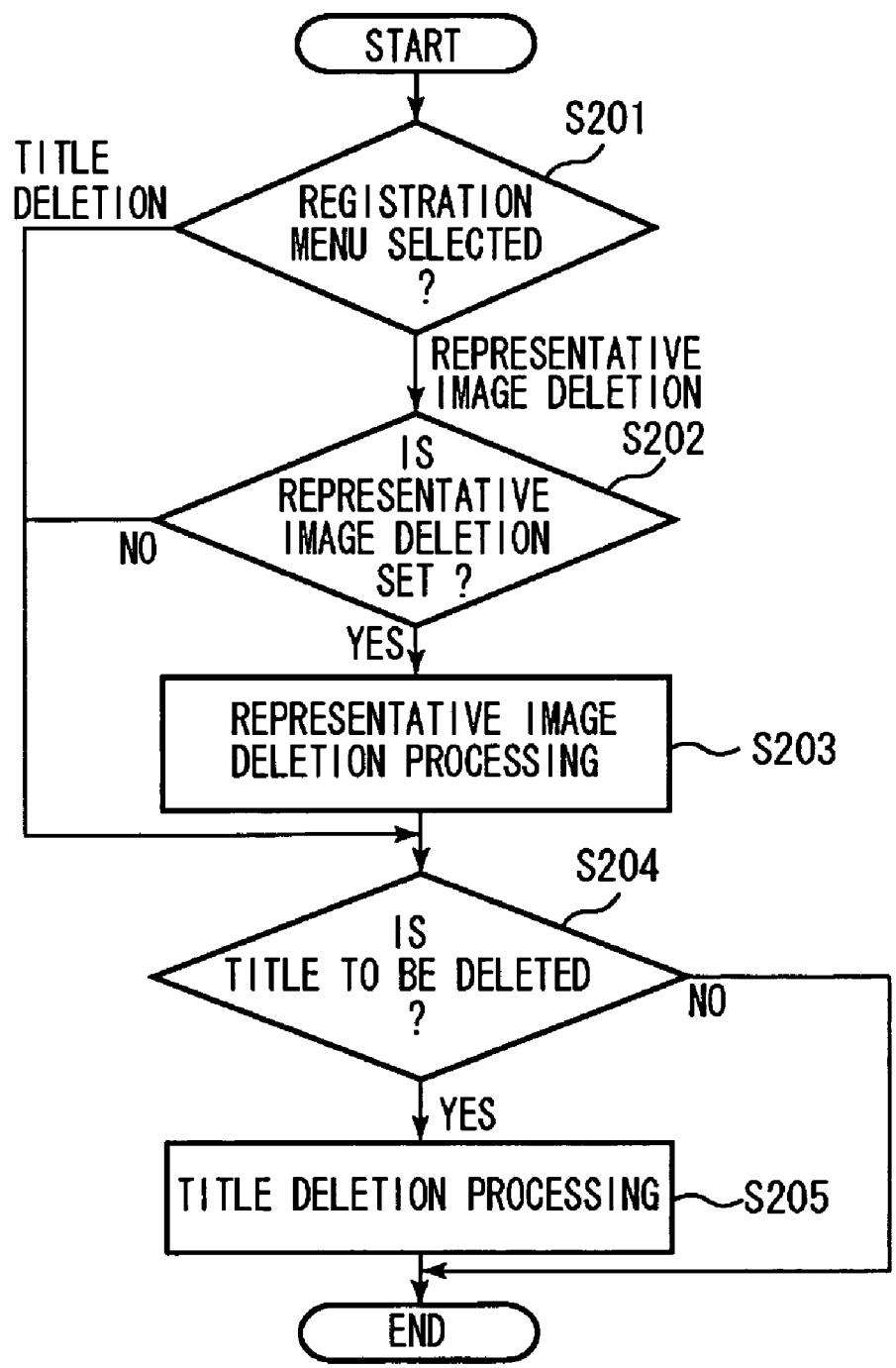
FIG. 9 is a flowchart illustrating a processing flow when the representative information is deleted.

FIG. 9 is a flowchart illustrating a flow when the representative information is deleted. Referring to FIGS. 5A to 5F and 6A to 6C, the flow when the representative information is deleted will be described.

In the camera 100, in step S201, the system controller 101 determines whether "representative image deletion" or "title deletion" of the registration menu is selected in the representative image registration menu screen (FIG. 5C).

Figure 7A:
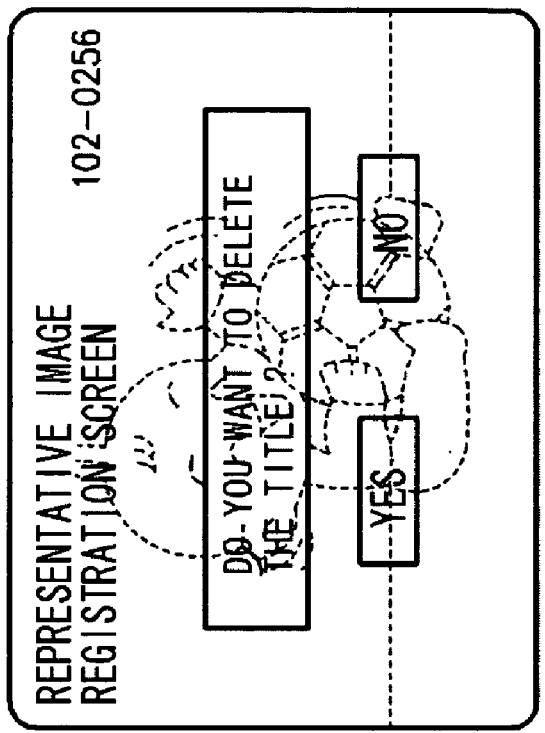
FIGS. 7A and 7B illustrate procedures for registering and deleting the representative information that is displayed on the display unit as the user interface.

In step S201, when the "representative image deletion" is selected, the processing proceeds to step S202, and the system controller 101 determines whether representative image deletion setting is instructed. More specifically, when the user selects the "representative image deletion" in the representative image registration menu screen (FIG. 5C), the screen is changed to a representative image deletion setting screen as illustrated in FIG. 7A. On the representative image deletion setting screen, the user can select "Yes" to set the representative image deletion and "No" to cancel the deletion.

In step S202, when the representative image deletion setting is instructed (YES in step S202), the processing proceeds to step S203, and the system controller 101 executes representative image deletion processing.

Figure 7B:
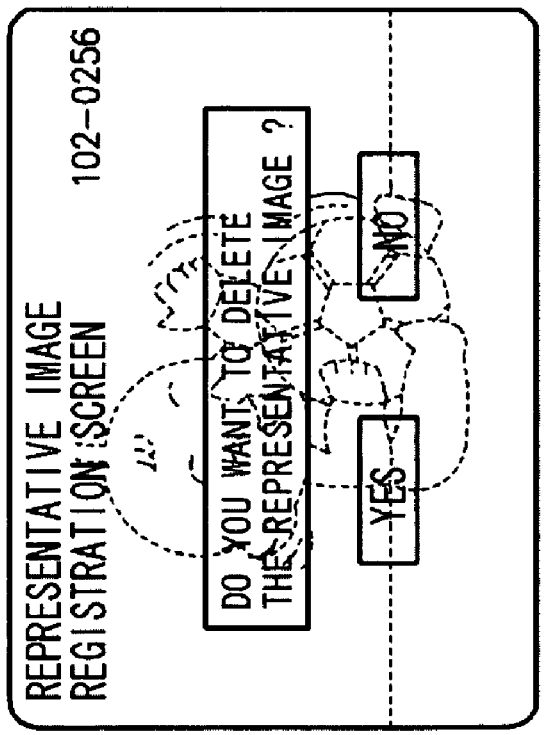

After the representative image deletion processing, the processing proceeds to step S204, and the system controller 101 determines whether title deletion setting is instructed. More specifically, when the user selects "Yes" in the representative image deletion setting screen (FIG. 7A), a title deletion setting screen is subsequently displayed as illustrated in FIG. 7B.

In the title deletion setting screen, the user can selects "Yes" to delete the title and "No" not to delete the title. Both when the title deletion is selected in step S201 and when the representative image deletion setting is not instructed in step S202 (NO in step S202), the processing proceeds to step S204.

In step S204, when the title deletion setting is not instructed (NO in step S204), the processing is ended. On the other hand, in step S204, when the title deletion setting is instructed (YES in step S204), the processing proceeds to step S205, and the system controller 101 executes the title deletion processing and then the processing is ended.

According to the present exemplary embodiment, the method for recording the image data itself as the representative information is described. However, a method for recording a file path of the selected representative image may be adopted. In this case, since a larger image than the above-described method is reproduced, reproduction time is increased. However, capacity for recording the representative image which is used in the recording medium 106 can be suppressed as small as possible.

Further, according to the present exemplary embodiment, as an example, a still image is registered as the representative image. However, if the camera can record a moving image, the moving image can also be registered as the representative image.

Figure 10:
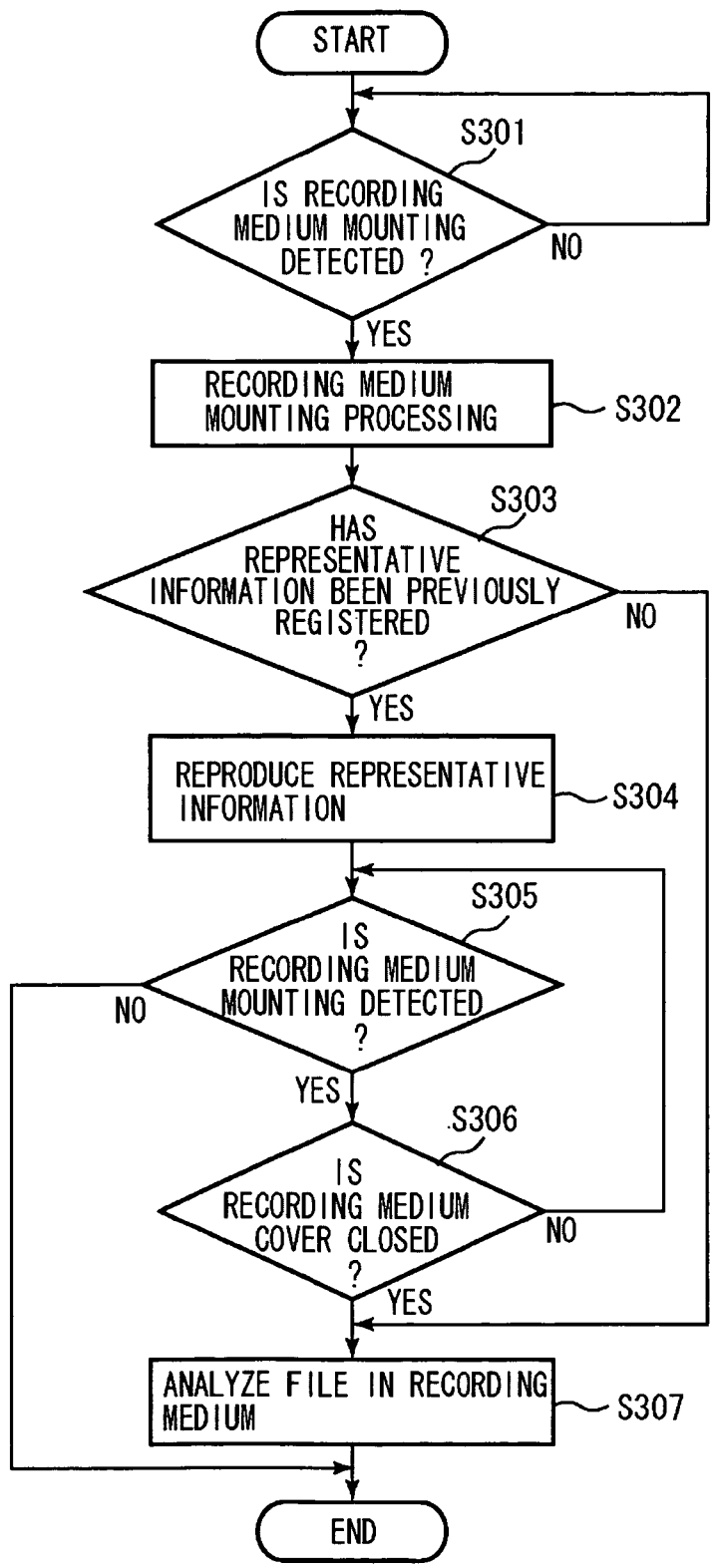
FIG. 10 is a flowchart illustrating a processing flow when the recording medium is mounted.

Next, a method for reproducing the representative image when the recording medium 106 is mounted will be described. FIG. 10 is a flowchart illustrating a processing flow when the recording medium 106 is mounted. In the camera 100, in step S301, the system controller 101 waits until the recording medium 106 is mounted. When the recording medium mounting detection unit 201 detects that the recording medium 106 is mounted (YES in step S301), the processing proceeds to step S302.

In step S302, the system controller 101 causes the mounting processing unit 112 to perform mounting processing on the recording medium 106. When the mounting processing is completed, the camera 100 can access a file in the recording medium 106.

Prior to performing file analysis, in step S303, the system controller 101 causes the representative information presence/absence determination unit 115 to determine whether the representative information is registered. More specifically, the system controller 101 searches the "PRIVATE" folder, and when the "PRIVATE" folder exists, the system controller 101 further searches in the folder to determine whether the "TITLE.JPG" file exists.

Simultaneously, the system controller 101 determines whether the "TITLE.DAT" file exists. When any one or both of the "TITLE.JPG" and the "TITLE.DAT" exist, the system controller 101 determines that the representative information is registered.

It is understood from above descriptions that the file analysis according to the present exemplary embodiment is performed not on the "PRIVATE" folder in which the representative information illustrated in FIG. 4B is registered but on the folders under the "DCIM" folder (the folder including the original data other than the folder in which the representative information is registered), which is similarly applied to a second exemplary embodiment.

When it is determined that the representative information has been registered (YES in step S303), the processing proceeds to step S304, and the system controller 101 performs the reproduction processing on the representative information. The representative image is read out from the recording medium 106 and displayed on the display unit 107 after being converted into the data for being displayed by the image processing unit 103.

Further, the title is superimposed on the representative image and displayed after the processing is performed by the image processing unit 103 (FIG. 6A). The user can confirm recorded content in the recording medium 106 using the representative information.

In step S305, while the representative information is being displayed, the system controller 101 constantly performs detection of whether the recording medium 106 is mounted. At this point, since the camera 100 does not access the recording medium 106, when the mounted recording medium 106 is not what the user is looking for, the recording medium 106 can be instantly removed. When the recording medium 106 is removed while the representative information is being displayed (NO in step S305), the processing is ended.

When mounting of the recording medium 106 is detected (YES in step S305), the processing proceeds to step S306. In step S306, the system controller 101 causes the recording medium cover detection unit 202 to detect whether the cover of the recording medium is open or closed. When the status of the cover of the recording medium is open (NO in step S306), the processing returns to step S305 to check whether the recording medium is mounted. When the status of the cover of the recording medium is changed from open to closed (YES in step S306), the processing proceeds to step S307, and the system controller 101 starts the file analysis in the recording medium 106.

More specifically, when the mounted recording medium 106 is what the user is looking for, the user closes the cover of the recording medium to start the file analysis in the recording medium 106.

When it is determined that the representative information has not been registered in step S303 (NO in step S303), the processing proceeds to step S307, and the system controller 101 starts the file analysis in the recording medium 106. When the file analysis is completed, a series of processing which is performed when the recording medium 106 is mounted is ended.

According to the above described first exemplary embodiment, when the recording medium 106 is mounted, whether the cover of the recording medium is open or closed is detected and the processing moves onto the file analysis. According to a second exemplary embodiment, the processing proceeds to the file analysis according to time. A configuration of the digital camera according to the second exemplary embodiment is similar to that as illustrated in FIG. 1, and the description thereof is not repeated.

Figure 11:
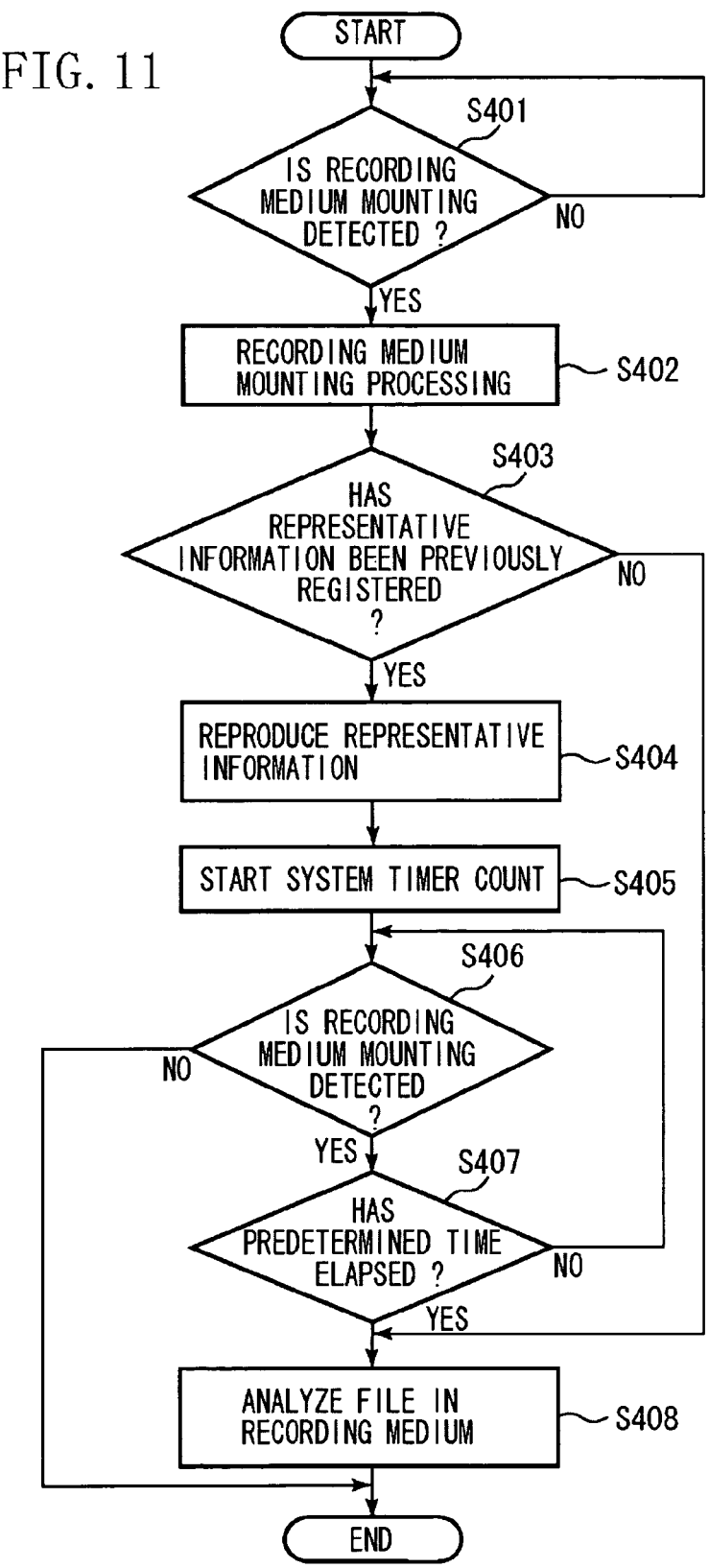
FIG. 11 is a flowchart illustrating a processing flow when the recording medium is mounted according to another exemplary embodiment of the present invention.

FIG. 11 is a flowchart illustrating a flow of the processing when the recording medium 106 is mounted. In the camera 100, in step S401, the system controller 101 waits until the recording medium 106 is mounted, and when the recording medium mounting detection unit 201 detects that the recording medium 106 is mounted (YES in step S401), the processing proceeds to step S402.

In step S402, the system controller 101 causes the mounting processing unit 112 to perform the mounting processing on the recording medium 106. When the mounting processing is completed, the camera 100 can access the file in the recording medium 106.

Prior to performing the file analysis, in step S403, the system controller 101 causes the representative information presence/absence determination unit 115 to determine whether the representative information is registered. More specifically, the system controller 101 searches for the "PRIVATE" folder and when the "PRIVATE" folder exists, the system controller 101 searches in the folder to determine whether the "TITLE.JPG" file exists.

Simultaneously, the system controller 101 determines whether the "TITLE.DAT" file exists. When any one or both of the "TITLE.JPG" and the "TITLE.DAT" exist, the system controller 101 determines that the representative information is registered.

In step S403, when it is determined that the representative information is registered (YES in step S403), the processing proceeds to step S404, and the system controller 101 performs the reproduction processing on the representative information. The representative image is read out from the recording medium 106 and displayed on the display unit 107 after being converted into the data to be displayed, by the image processing unit 103.

Further, the title is superimposed on the representative image and displayed after the processing is performed by the image processing unit 103 (FIG. 6A). The user can confirm recorded content in the recording medium 106 using the representative information.

When the representative information is displayed in step S404, the processing proceeds to step S405, and the system controller 101 causes a timing unit, namely the system timer unit 116 to start counting.

In step S406, while the representative information is being displayed, the system controller 101 constantly performs detection of whether the recording medium 106 is mounted. At this point, since the camera 100 does not access the recording medium 106, when the mounted recording medium 106 is not what the user is looking for, the recording medium 106 can be instantly removed. When the recording medium 106 is removed while the representative information is being displayed (NO in step S406), the processing is ended.

When mounting of the recording medium 106 is detected (YES in step S406), the processing proceeds to step S407. In step S407, the system controller 101 detects whether a predetermined time has elapsed based on time counted by the system timer unit 116. When the predetermined time has not yet elapsed (NO in step S407), the processing returns to step S406 to determine whether mounting of the recording medium 106 is still detected. When the predetermined time has elapsed (YES in step S407), the processing proceeds to step S408, and the system controller 101 starts the file analysis in the recording medium 106. The predetermined time would be set to a time that is long enough for the user to view the representative information and determine whether the mounted recording medium 106 is a desired one. For example, the predetermined time might be set to five seconds. In exemplary embodiments, the predetermined time is a user settable variable with a preset default value.

In step S403, when it is determined that the representative information has not been registered (NO in step S403), the processing proceeds to step S408 and the system controller 101 starts the file analysis in the recording medium 106. When the file analysis is completed, a series of the processing which is performed when the recording medium 106 is mounted is ended.

In the above-described first and second exemplary embodiments, the methods for displaying the representative image and/or the title as the representative information of the camera 100 are described. However, the present invention can be applied to other systems, for example, a music player for reproducing music recorded in a detachable recording medium. In this case, the representative information is audio data and a part of favorite music may be registered as representative audio data.

By registering the representative audio data, when the recording medium is mounted in a music player, the representative music of the recorded music is output. Thus, the user can instantly know the recorded content. In this case of the music player, an audio processing unit is equivalent to the image processing unit 103 and an audio output unit is equivalent to the display unit 107 in FIG. 1.

Figure 12:
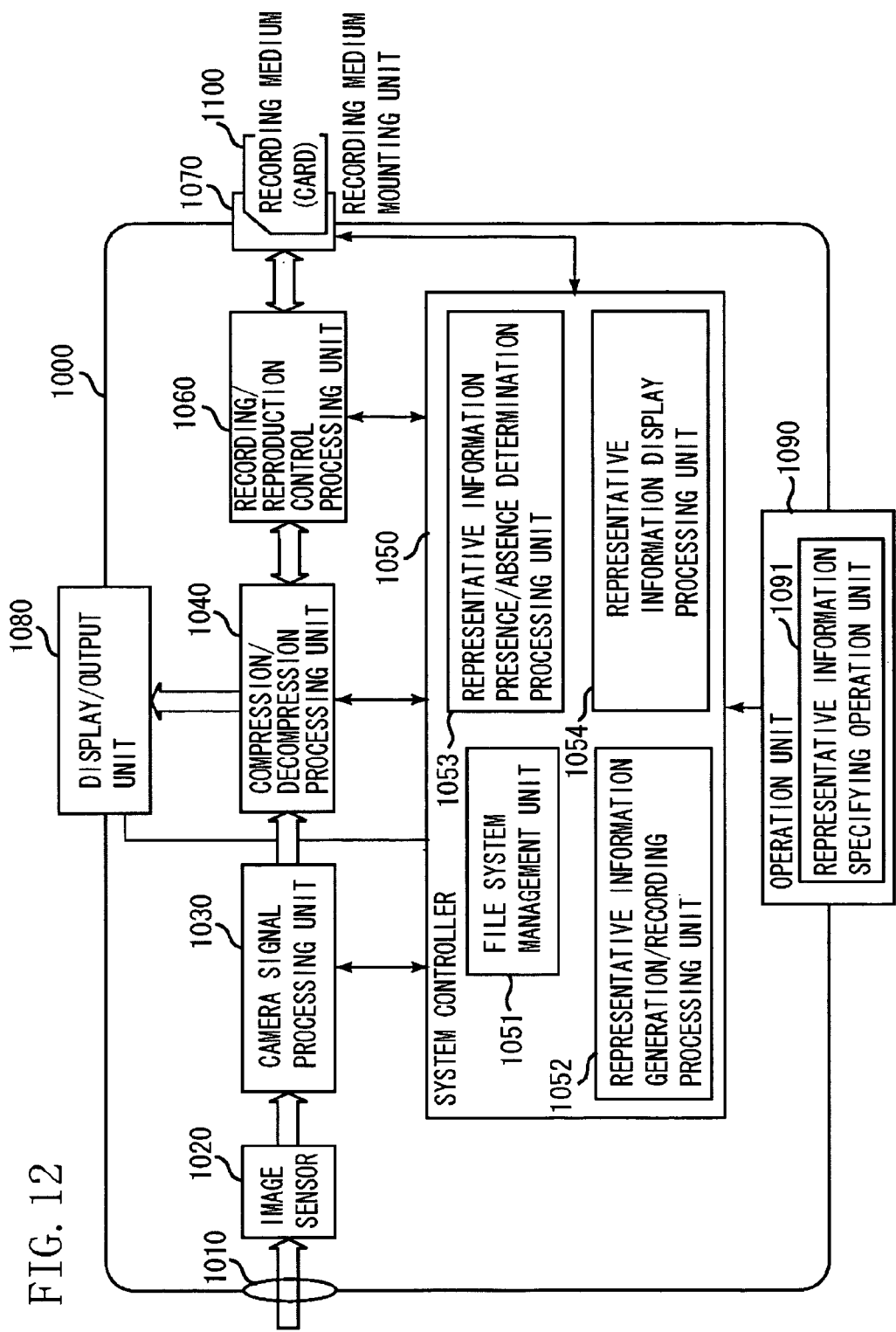
FIG. 12 is a block diagram illustrating a configuration of a digital camera according to an exemplary embodiment of the present invention.

FIG. 12 is a block diagram illustrating a configuration of a digital camera (hereinafter, referred to as a "camera") according to a third exemplary embodiment. A recording medium 1100 is detachably mounted in a camera 1000.

Figure 13:
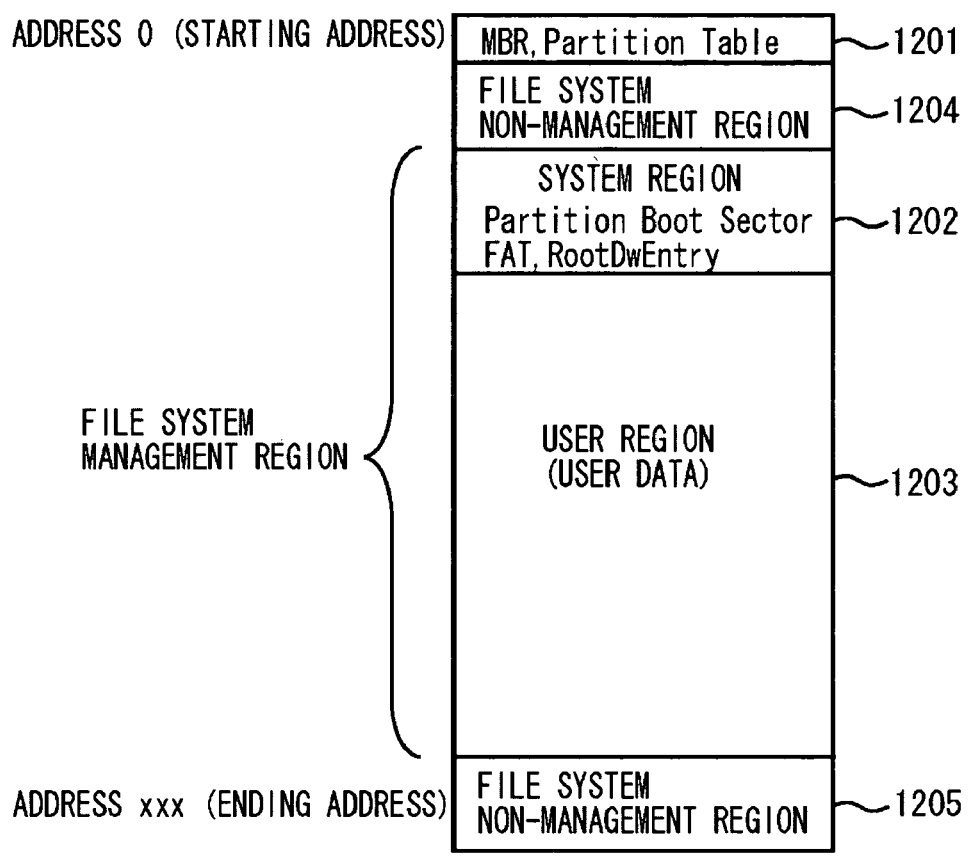
FIG. 13 illustrates a regional structure in the recording medium.

A regional structure of the recording medium 1100 is described below. FIG. 13 illustrates an example of the regional structure in the recording medium 1100. Here, as an example, a file allocation table (FAT) file system will be described. A region 1201 includes a master boot record (MBR) and a partition table in which partition information such as a starting sector of a partition (file system) in the recording medium 1100 is recorded.

A system region 1202 records information managed by the file system such as information about the FAT and each file. A user region 1203 records data such as an image recorded by the user. A spare region 1204 and a spare region 1205 are regions that are not managed by the file system. These regions are generated when starting position in the region managed by the file system is adjusted and usually are not used.

In the present exemplary embodiment, the regions 1201, 1202, and 1203 that are used by the file system are referred to as a first region, and the non-management regions 1204 and 1205 that are not used by the file system are referred to as a second region.

Returning to FIG. 12, an optical system 1010 includes a lens and an aperture system. An image sensor 1020 captures an image of an object and converts image light entered from the optical system 1010 into an electric signal. A camera signal processing unit 1030 performs digital conversion on the electric signal output from the image sensor 1020 and signal processing such as various compensations.

A compression/decompression processing unit 1040 compresses the signal received from the camera signal processing unit 1030 into a data format to record in a recording medium 1100. When reproducing an image, the compression/decompression processing unit 1040 decompresses the compressed data read out from the recording medium 1100.

A system controller 1050 includes a central processing unit (CPU) and a memory and performs a status management and execution processing control of each processing unit. The system controller 1050, which will be described in detail below, includes a file system management unit 1051, a representative information generation/recording processing unit 1052, a representative information presence/absence determination processing unit 1053, and a representative information display processing unit 1054.

A recording/reproduction control processing unit 1060 controls writing and reading of the data into and from the recording medium 1100 according to the file system which is controlled by the file system management unit 1051.

A recording medium mounting unit 1070 includes a socket for mounting the recording medium 1100 and has a recording medium mounting detection function for detecting that the recording medium 1100 is mounted.

A display/output unit 1080, namely an output unit, receives an output video signal from the compression/decompression processing unit 1040 and a menu display signal from the system controller 1050, and outputs a signal corresponding to a display on a view finder and a liquid crystal panel or various types of interfaces.

An operation unit 1090 includes a button switch provided in a main body or a remote controller by which the user issues instructions for various types of processing and various types of settings for capturing the image and reproduction execution. The operation unit 1090, which will be described in detail below, includes a representative information specifying operation unit 1091.

Configuration elements for audio are not illustrated. However, the image sensor 1020 and the display/output unit 1080 can be respectively replaced with a microphone and a speaker to record and reproduce the audio by similar processing. When the moving image is recorded, the video and the audio can be simultaneously recorded and multiplexed by the compression/decompression processing unit 1040.

When the camera 1000 which has the configuration described above detects that the recording medium 1100 is mounted in the recording medium mounting unit 1070 in the reproduction mode, the system controller 1050 starts the reproduction processing.

The file system management unit 1051 in the system controller 1050 enables the recording medium 1100 to perform an operation such as recording, reproduction, and deletion of a plurality of files. The file system management unit 1051 performs the file analysis such as a number of files according to a file system rule to reproduce an image file in the recording medium 1100 via the recording/reproduction control processing unit 1060. Further, the file system management unit 1051 has a function for acquiring a position of the region that is not managed by the file system (second region).

The representative information generation/recording processing unit 1052 in the system controller 1050 converts the representative information that represents recorded content in the first region of the recording medium 1100 into a size and format which can be recorded in the second region. Then, the converted representative information is recorded in the second region via the recording/reproduction control processing unit 1060.

Since the representative information to be recorded in the second region of the recording medium 1100 is not managed by the file system, the representative information needs to be defined in a unique data structure. In this case, considering characteristics such as a capacity of the system controller 1050 and a minimum access unit of the recording medium 1100, the data structure may be formed so that the representative information can be easily acquired using minimum information for easy access.

Figure 14:
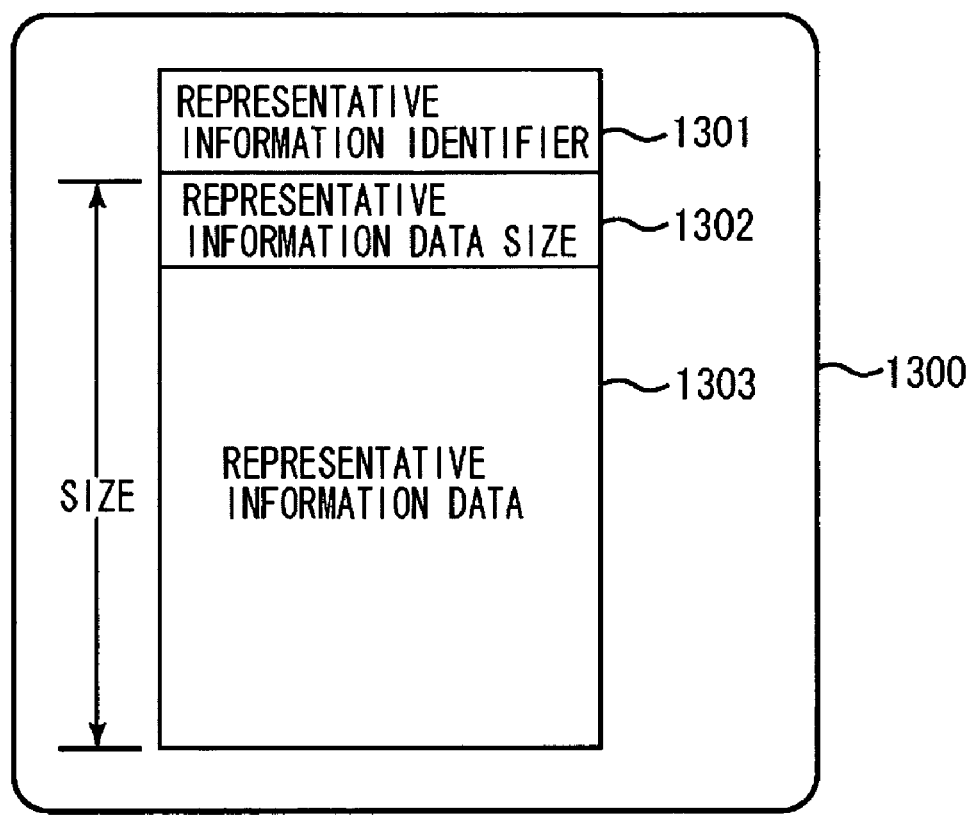
FIG. 14 illustrates an example of data structure of the representative information.

FIG. 14 illustrates an example of the data structure of the representative information. For easy access, the representative information 1300 includes a representative information identifier 1301 which indicates that the data is the representative information, a data size 1302 of the image or the character string of the representative information, and a data main body 1303.

Further, when a plurality of formats can be selected for the representative information (data main body), it is possible to make a determination based on the representative information identifier 1301, or to add information for determining the data format. Furthermore, the data size may have a fixed length, and a specific identifier may be added to an end of the data main body 1303 to specify a data region size. In this case, the representative information 1300 does not need to include the data size 1302.

The representative information presence/absence determination processing unit 1053 in the system controller 1050 determines that the representative information is recorded in the second region of the recording medium 1100. More specifically, the representative information presence/absence determination processing unit 1053 accesses the second region of the recording medium 1100 and determines whether an identifier in the second region corresponds to the representative information identifier 1301. When the identifier in the second region corresponds to the representative information identifier 1301, it is determined that the representative information is present.

The representative information display processing unit 1054 in the system controller 1050 reads out the representative information recorded in the second region of the recording medium 1100 and displays it on the display/output unit 1080.

The representative information specifying operation unit 1091 in the operation unit 1090 performs selection and specification of the image of the representative image by the representative information generation/recording processing unit 1052 in the system controller 1050, and performs entry of characters.

Figure 15:
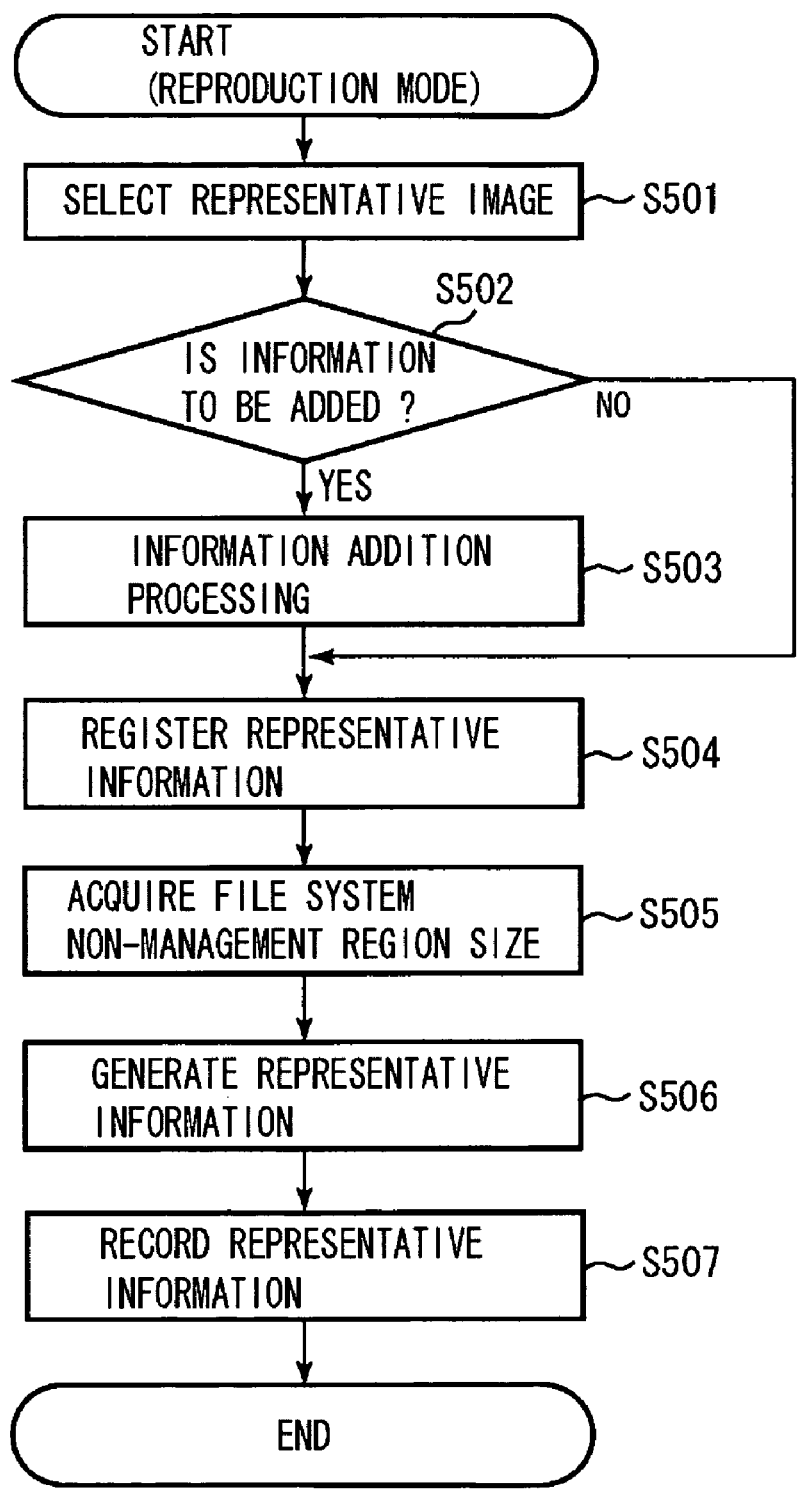
FIG. 15 is a flowchart illustrating a processing flow when the representative information is registered.
Figure 16:
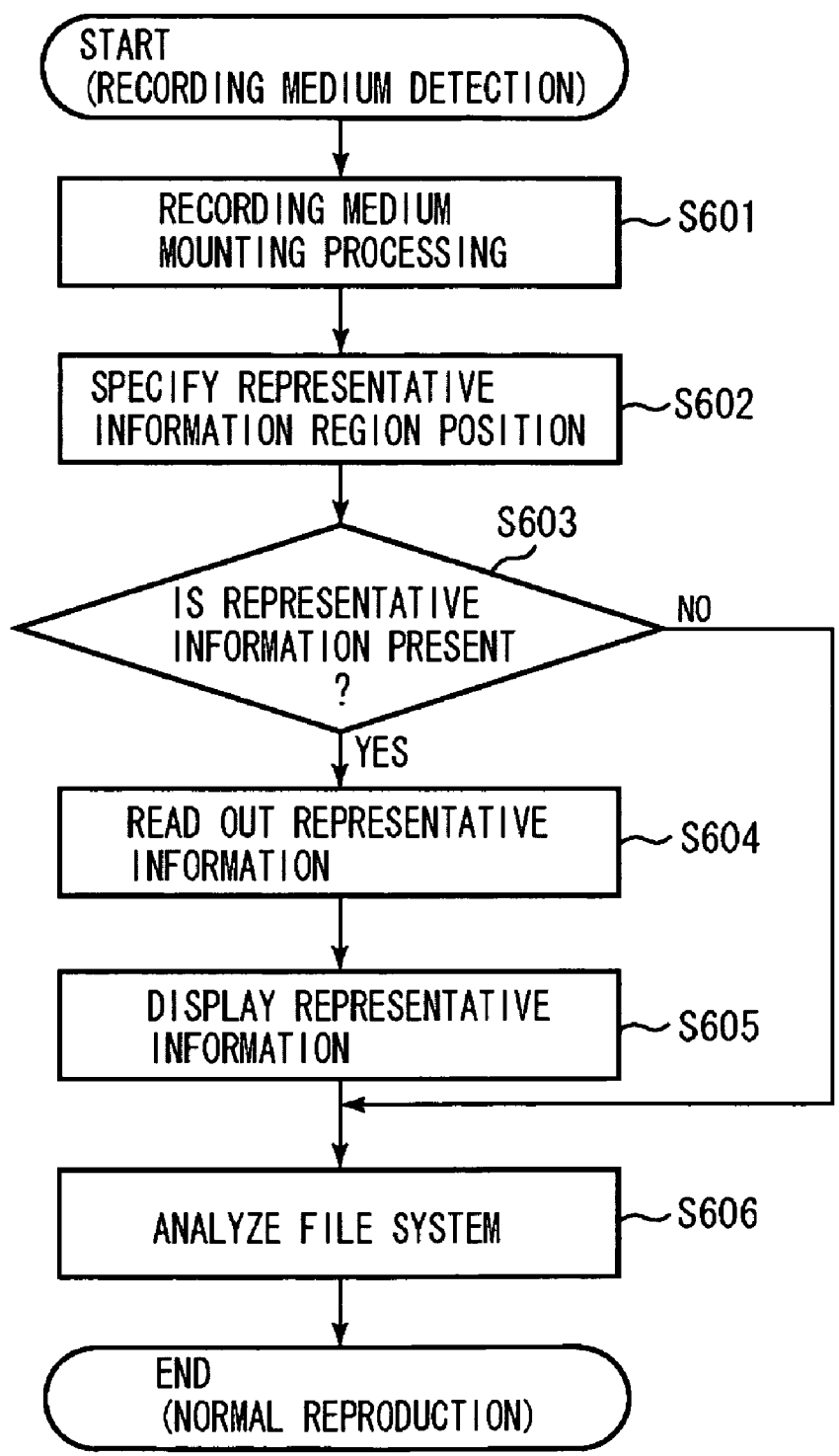
FIG. 16 is a flowchart illustrating a processing flow when the recording medium is mounted.

FIGS. 15 and 16 are flowcharts each illustrating a flow of processing in the camera 1000 of the third exemplary embodiment. FIG. 15 illustrates processing for generating and recording the representative information, and FIG. 16 illustrates processing for displaying the representative information.

The processing for generating and recording the representative information is described next. The processing illustrated by the flowchart in FIG. 15 is executed, for example, when one still image is recorded as the representative information. The representative information is generated/recorded in a state where the recording medium 1100 in which a plurality of still images are recorded is mounted in the camera 1000 and the still image can be confirmed. FIGS. 17A to 17F illustrate, similar to FIGS. 5A to 5G, the procedures for registering the representative image via the user interface displayed on the display/output unit 1080.

Figure 17A:
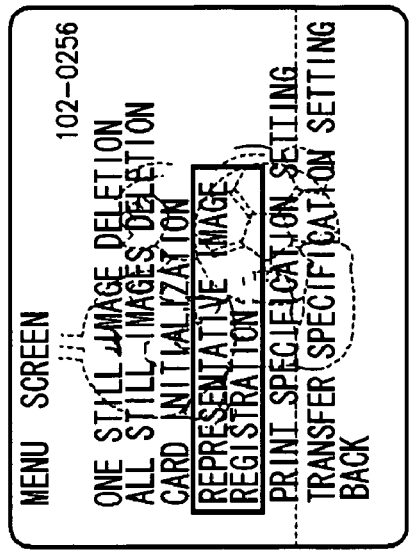
FIGS. 17A to 17F illustrate procedures for registering the representative information which is displayed on a display/output unit as a user interface.
Figure 17B:
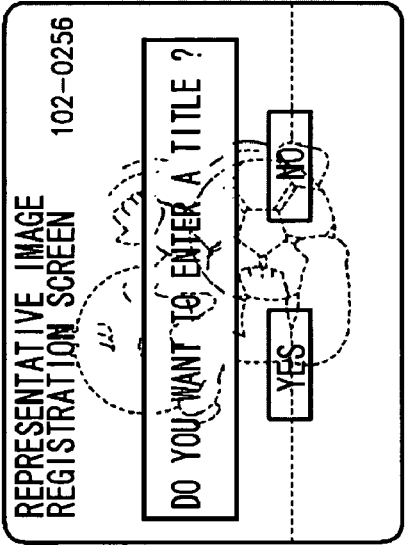
Figure 17C:

In step S501, the user operates the representative information specifying operation unit 1091 to select the representative image as the representative information. By confirming the image displayed on the display/output unit 1080, the user selects one image (FIG. 17A) that represents the recorded content in the recording medium 1100 and sets it as the representative image (FIGS. 17B and 17C).

Figure 17D:
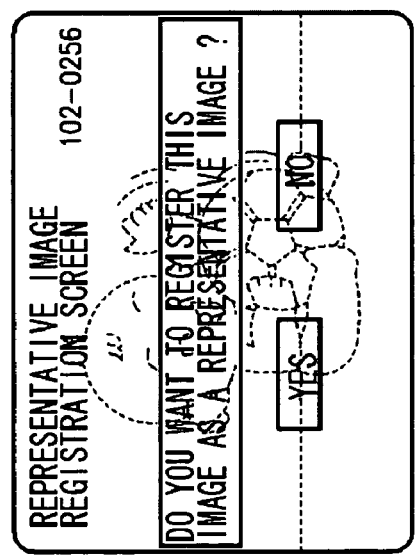

In step S502, the system controller 1050 determines whether the information is to be added to the representative information. More specifically, whether the title (character string) as the representative information is entered is determined (FIG. 17D). When the information is to be added (YES in step S502), the processing proceeds to step S503. When the information is not to be added (NO in step S502), the processing proceeds to step S504.

In step S503, the system controller 1050 performs information adding processing. Here, the character is entered via the representative information specifying operation unit 1091 (FIG. 17E) and the character string as the title is added to the representative image.

Figure 17F:
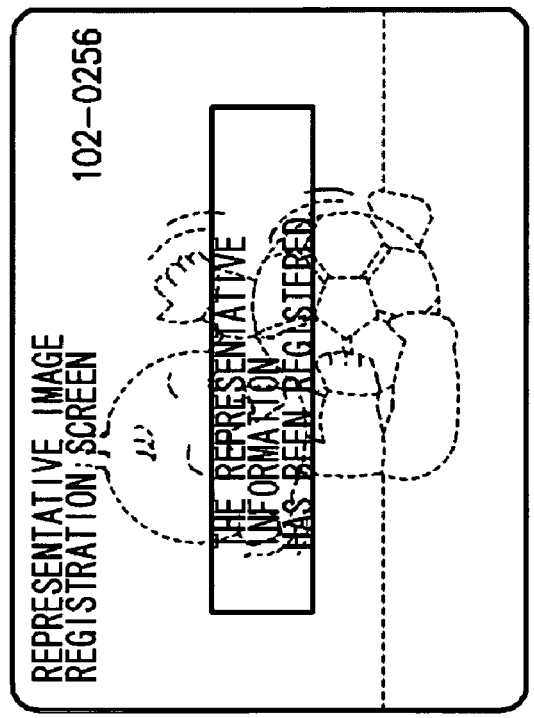
Figure 17E:
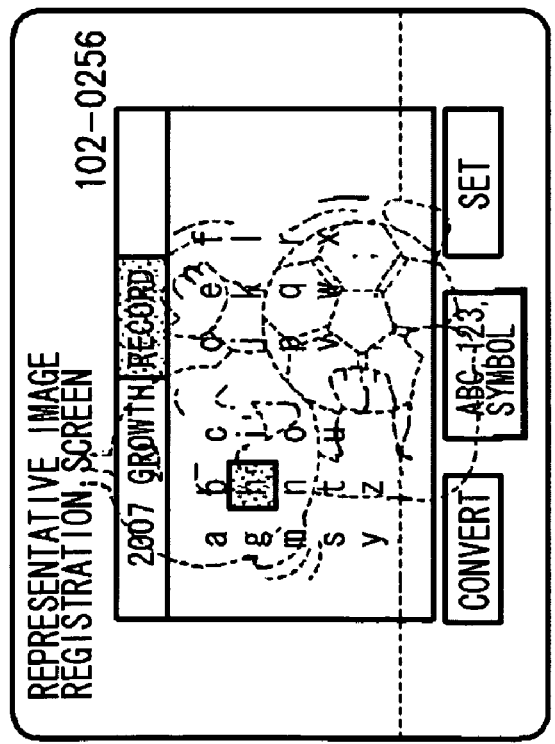

In step S504, the system controller 1050 registers the representative image selected in step S501 and the title added in step S503 as the representative information in the memory in the system controller 1050 (FIG. 17F).

In step S505, in order to confirm whether the second region of the recording medium 1100 exists, the system controller 1050 acquires a size of the second region from a positional relationship between the first region and the second region which is acquired by the file system management unit 1051.

In step S506, the system controller 1050 causes the representative information generation/recording processing unit 1052 to generate the representative information 1300. Here, the representative information generation/recording processing unit 1052 performs data compression and data conversion so that the representative information registered in the memory in step S504 is stored within the size of the second region acquired in step S505.

When the recording capacity of the recording medium 1100 is small, the size of the second region may be too small to record the representative information thereon. In this case, the representative information may be changed to include only the title. Further, the processing in step S505 can be performed prior to step S501 so that the representative information can be selected depending on the capacity of the second region.

In step S507, the system controller 1050 causes the representative information generation/recording processing unit 1052 to record the representative information generated in step S506 in the second region of the recording medium 1100 via the recording/reproducing control processing unit 1060.

Steps S501 to S507 as described above are performed, and the recording medium 1100 including the second region in which the representative information is recorded is generated.

The above describes an example which uses one representative image as the representative information. However, if a plurality of images can be aligned and displayed according to resolution and display capacity of the display/output unit 1080, an index image may be generated as the representative information.

More specifically, the plurality of images is selected in step S501, and the plurality of selected images is each scaled down to generate the index image laid out in one screen in step S506. Thus, the representative image can include more information.

Next, the processing for displaying the representative information will be described. The processing illustrated by the flowchart in FIG. 16 is executed when it is detected that the recording medium 1100 is mounted in the camera 1000. In step S601, the system controller 1050 causes the recording/reproduction control processing unit 1060 to perform the mounting processing for accessing the recording medium 1100.

In the mounting processing, connection between the recording medium 1100 and the recording medium mounting unit 1070 is established and identification and initialization of the recording medium 1100 are performed. When the connection to the recording medium 1100 can not be established, an error occurs and the subsequent processing will not be performed.

In step S602, the system controller 1050 causes the file system management unit 1051 to specify the position of a representative information region in the second region of the recording medium 1100.

In step S603, the system controller 1050 causes the representative information presence/absence determination processing unit 1053 to acquire an identifier at the regional position specified in step S602 and determine whether the representative information exists. When the acquired identifier corresponds to the representative information identifier 1301 and thus it is determined that the representative information is present (YES in step S603), the processing proceeds to step S604. When the representative information is not present (NO in step S603), the processing proceeds to step S606.

In step S604, the system controller 1050 causes the representative information display processing unit 1054 to read out the representative information from the second region of the recording medium 1100. Here, the representative information data size 1302 is acquired and the representative information data 1303 is read out to the memory in the system controller 1050.

Figure 18:
FIG. 18 illustrates a status in which the representative information is displayed.

In step S605, the system controller 1050 performs display processing on the representative information data read out in step S604. The system controller 1050 performs the processing such as conversion necessary for displaying/outputting the data in the memory, on the display/output unit 1080, and displays the image and the title on the display/output unit 1080 (refer to FIG. 18).

In step S606, similar to conventional reproducing processing, the system controller 1050 performs analysis processing of the file system necessary for reproducing and operating the file in the first region. Here, a directory entry and the FAT are analyzed, and a directory structure and file information which are recorded in the first region of the recording medium 1100 are acquired. This step enables file access to the first region in the subsequent steps, and thus the reproducing processing can be performed.

When it is detected that the recording medium 1100 including the second region in which the representative information generated by the processing in steps S501 to S507 is recorded is mounted, in the processing as described above, the representative information can be displayed prior to access to the first region. Further, when it is detected that the recording medium 1100 including the second region in which the representative information is not present is mounted, the conventional processing is performed.

In the present exemplary embodiment, the processing illustrated by the flowchart in FIG. 16 is unconditionally executed when it is detected that the recording medium 1100 is mounted. However, it can be executed only when a representative information confirmation mode is selected if the representative information confirmation mode is provided.

In a fourth exemplary embodiment, recording of the representative information as described in the third exemplary embodiment, is performed immediately after an image is captured. A configuration of the digital camera according to the fourth exemplary embodiment is similar to that illustrated in FIG. 12, and the description thereof is not repeated.

Figure 19:
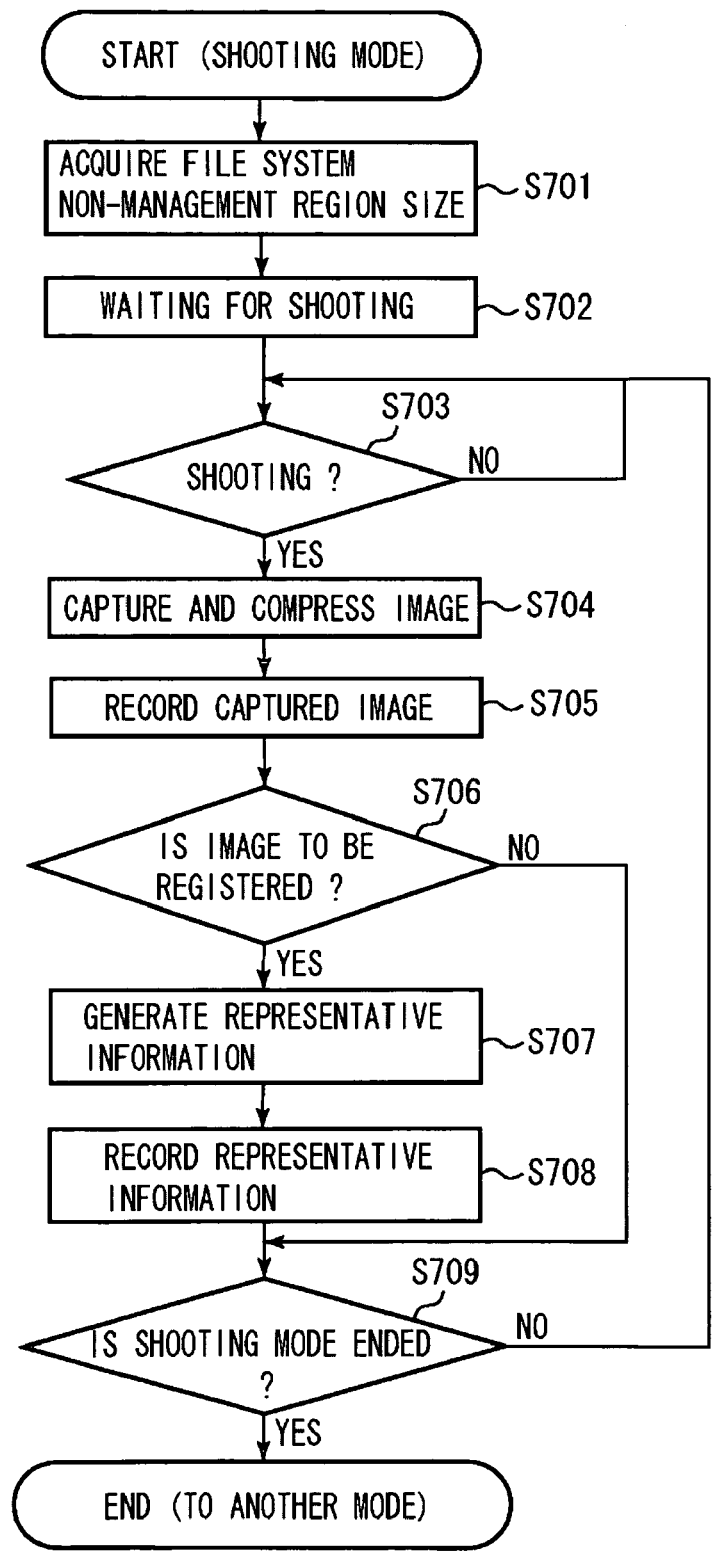
FIG. 19 is a flowchart illustrating a flow when the representative information is registered according to another exemplary embodiment.

FIG. 19 is a flowchart illustrating a processing flow in the camera 1000 of the fourth exemplary embodiment, more specifically, the flow carried out when the representative information is generated and recorded. The processing illustrated by the flowchart in the FIG. 19 is executed when a mode is shifted to a shooting mode in a state where the file in the recording medium 1100 can be manipulated with the camera 1000.

In step S701, after shifting to the shooting mode, the system controller 1050 acquires the size of the second region from the positional relationships between the first region and the second region which is acquired by the file system management unit 1051 to confirm presence of the second region of the recording medium 1100.

In step S702, the system controller 1050 prepares for recording of the representative information in the second region and is in a waiting status for capturing an image.

In step S703, the system controller 1050 determines whether an image capturing operation is executed. When the image capturing operation is executed (YES in step S703), the processing proceeds to step S704. In steps S704 and S705, the system controller 1050 compresses the captured image into the recording format and records in the first region of the recording medium 1100 as a conventional image capturing operation.

In step S706, the system controller 1050 confirms the recorded image and whether the recorded image is to be registered as the representative information. When the recorded image is to be registered as the representative information (YES in step S706), the processing proceeds to step S707. When the recorded image is not to be registered (NO in step S706), the processing proceeds to step S709 and is in the waiting status for capturing the image. The waiting status returns to step S703 when it is determined in step S709 that the shooting mode has not been ended. When it is determined in step S709 that the shooting mode has ended, processing is ended.

In step S707, the system controller 1050 causes the representative information generation/recording processing unit 1052 to generate the representative information 1300. The image data captured in step S704 is compressed (recompressed) and converted to be stored within the size of the second region acquired in step S701.

In step S708, the system controller 1050 causes the representative information generation/recording processing unit 1052 to record the representative information generated in step S707 in the second region of the recording medium 1100 via the recording/reproducing control processing unit 1060.

The captured image can be registered as the representative information immediately after capturing an image in a series of operations of the shooting mode, and the recording medium 1100 which records the representative information in the second region can be generated, so that convenience is improved.

The third and fourth exemplary embodiments describe an example in which the present invention is applied to the camera 1000 that functions as a recording and reproducing apparatus. However, the present invention can be applied to a reproducing apparatus and a recording apparatus. For example, FIG. 20 illustrates a configuration of a reproducing apparatus 1200 that is obtained by removing a recording function from the recording and reproducing apparatus illustrated in FIG. 12.

Figure 20:
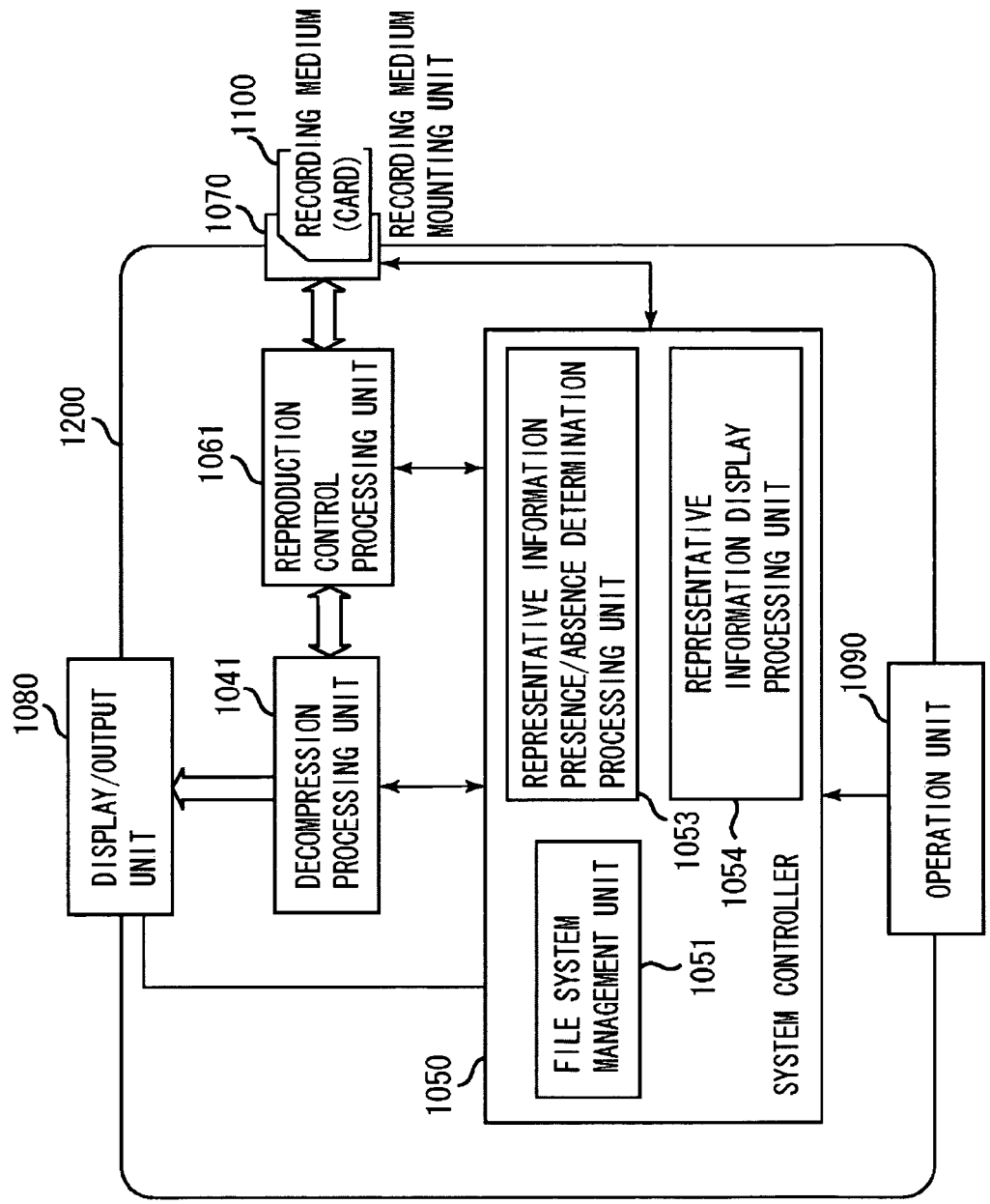
FIG. 20 is a block diagram illustrating an example of a configuration of a reproducing apparatus according to exemplary embodiments of the present invention.

When the reproducing apparatus 1200 in FIG. 20 is compared to the camera 1000 in FIG. 12, the reproducing apparatus 1200 does not include the optical system 1010, the image sensor 1020, the camera signal processing unit 1030, the representative generation/recording processing unit 1052, and the representative information specifying operation unit 1091.

Further, the reproducing apparatus 1200 includes a decompression processing unit 1041 and a reproduction control processing unit 1061 instead of the compression/decompression processing unit 1040 and the recording/reproduction control processing unit 1060 respectively. The reproducing apparatus 1200 as described above performs processing in steps S601 to S606 and the representative information in the recording medium 1100 in which the representative information is recorded can be displayed.

A method for ensuring a necessary size in the second region when the regional structure of the first region is formed in the recording medium 1100 is described next. When an entire size of the representative information 1300 is determined, the file management unit 1051 locates a region starting position behind the system region 1202 within the file system rule to form the file system region.

With this configuration, the size of the second region for recording the representative information can be ensured. Further, when it is difficult to locate the starting position behind the system region 1202 according to the file system rule, the file system may be formed as a recording medium having a small size. Thus, the region 1205 which is on a last of the recording region of the recording medium can be ensured as the second region.

The present invention can be achieved by providing a recording medium in which program code (software) realizing the functions of the exemplary embodiments as described above is recorded to a system or an apparatus. A computer of the system or the apparatus (or CPU or micro processing unit (MPU)) reads out the program code stored in the recording medium to execute.

In this case, the program code itself which is read out from the recording medium realizes the functions of the above-described exemplary embodiments.

As the recording medium for providing the program code, for example, a floppy disk, a hard disk, an optical disk, a magneto-optical disk, a compact disk read only memory (CD-ROM), a CD recordable (CD-R), a magnetic tape, a nonvolatile memory card, and a read only memory (ROM) can be used.

The functions of the above-described exemplary embodiments can be realized by not only executing the program code read out by the computer. For example, a basic system or an operation system (OS) which is running on the computer can realize the functions of the above-described exemplary embodiments by performing a part or all of the actual processing based on an instruction of the program code.

Further, the program code read out from the recording medium may be written into a memory provided in a function expansion board inserted into the computer and a function expansion unit connected to the computer. In this case, after the program code is written into the memory, a CPU included in the function expansion board and the function expansion unit performs a part or all of the actual processing based on the instruction of the program code and realizes the functions of the above-described exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-045097 filed Feb. 26, 2008, which is hereby incorporated by reference herein in its entirety.

What is claimed is:

1. A reproducing apparatus comprising:
   a recording medium mounting detection unit configured to detect that a detachable recording medium is mounted;

a file analysis unit configured to analyze a file recorded on the recording medium;

an acquirement unit configured to acquire representative information that represents the file recorded on the recording medium;

a recording medium cover detection unit configured to detect an open and closed status of a recording medium cover; and a control unit configured to output the representative information to an output unit prior to file analysis by the file analysis unit when the recording medium mounting detection unit detects that the recording medium is mounted and when the recording medium cover detection unit detects an open status of the recording medium cover, wherein the control unit causes the file analysis unit to start file analysis when the recording medium cover detection unit detects that a status of the recording medium cover is changed from open to closed, after outputting the representative information to the output unit.

2. The reproducing apparatus according to claim 1, wherein the recording medium includes a first region that is managed by a file system and a second region that is not managed by the file system, wherein the file is recorded in the first region, wherein the representative information that represents the file recorded in the first region is recorded in the second region, and wherein the acquirement unit acquires the representative information from the second region.

3. The reproducing apparatus according to claim 1, wherein the representative information includes either one or both of an image and a character string.

4. A recording apparatus which uses a detachable recording medium including a first region that is managed by a file system to record a file in the first region and a second region that is not managed by the file system, the recording apparatus comprising:

a determination unit configured to determine whether representative image registration is set and whether representative title registration is set; and a representative information generation/recording processing unit configured to generate representative information that represents the file recorded in the first region and record the representative information as a separate file in the second region, wherein the representative information generation/recording processing unit generates and records a representative image file in the second region in a case that the determination unit determines that the representative image registration is set, and generates and records a representative title file in the second region in a case that the determination unit determines that the representative title registration is set.

5. The recording apparatus according to claim 4, further comprising a size acquirement unit configured to acquire a size of the second region, wherein the representative information generation/recording processing unit converts the representation information that represents the recorded file in the first region into one with a size and format which can be recorded in the second region.

6. The recording apparatus according to claim 4, further comprising an imaging unit configured to capture an image of an object, wherein a captured image can be recorded as the representative information in the second region immediately after capturing the image.

7. The recording apparatus according to claim 4, wherein the representative information generation/recording processing unit reduces a size of each of images as the representative information that represents the recorded file in the first region and generates an index image in which the reduced images are disposed on a screen.

8. The recording apparatus according to claim 4, further comprising an ensuring unit configured to ensure the size of the second region when the first region is formed.

* * * * *